US008988727B2

(12) United States Patent
Shibahara

(10) Patent No.: US 8,988,727 B2
(45) Date of Patent: Mar. 24, 2015

(54) IMAGE FORMING APPARATUS

(75) Inventor: Masami Shibahara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 502 days.

(21) Appl. No.: 13/302,939

(22) Filed: Nov. 22, 2011

(65) Prior Publication Data

US 2012/0133959 A1 May 31, 2012

(30) Foreign Application Priority Data

Nov. 29, 2010 (JP) ................................ 2010-264885

(51) Int. Cl.
*G06K 15/02* (2006.01)
*G03G 15/00* (2006.01)

(52) U.S. Cl.
CPC .. *G03G 15/5029* (2013.01); *G03G 2215/00734* (2013.01)
USPC .......................................................... 358/1.2

(58) Field of Classification Search
None
See application file for complete search history.

(56) References Cited

FOREIGN PATENT DOCUMENTS

| | | | |
|---|---|---|---|
| JP | 01249482 | * | 10/1989 |
| JP | H8-146855 | | 6/1996 |
| JP | 2002-296980 | | 10/2002 |
| JP | 2003-95482 | | 4/2003 |
| JP | 2005-219374 | | 8/2005 |
| JP | 2007216603 | * | 8/2007 |

OTHER PUBLICATIONS

JP-2003326798—translation, Ito et al, Nov. 2003, Japan.*
Office Action for Japanese Application No. 2010-264885 mailed Mar. 19, 2013.

* cited by examiner

*Primary Examiner* — Fan Zhang
(74) *Attorney, Agent, or Firm* — Pearl Cohen Zedek Latzer Baratz LLP

(57) ABSTRACT

An image forming apparatus includes an image formation stopping unit that, in a case of comparing the length of recording paper to actually be fed with the length of recording paper set and having determined that the recording paper length detected by a recording paper length detecting unit is shorter than the length of the recording paper input through a recording paper size inputting unit, causes an image forming operation to a photoconductor by the image forming unit to stop before an image formation length in a vertical scanning direction by the image forming unit reaches a recording paper length according to the recording paper length detecting unit.

6 Claims, 4 Drawing Sheets

IMAGE FORMING APPARATUS

This application is based on and claims the benefit of priority from Japanese Patent Application No. 2010-264885, filed on 29 Nov. 2010, the content of which is incorporated herein by reference.

BACKGROUND OF THE DISCLOSURE

1. Field of the Disclosure

The present disclosure relates to an image forming apparatus that does not have paper jams or toner splatter in a case of a paper size designated by a user and the size of paper fed differing.

2. Related Art

Conventionally, in an image forming apparatus having multiple functions, in a case of the image forming apparatus functioning as a printer, for example, information of the size of the recording paper to be used is included as a part of the image information from a personal computer. In addition, in a case of the image forming apparatus functioning as a photocopier, for example, the paper size is detected automatically by a predetermined sensor or the like.

Herein, in the case that a simplified image forming apparatus does not have a function of automatically detecting the size of recording paper, the image forming apparatus acquires the size information of the recording paper through a dial control or the like for size designation from the user.

However, in this case, if the user makes a mistake in a manual input, a case may arise in which the size of recording paper detected by the image forming apparatus control unit and the size of recording paper actually fed to the image forming unit differ.

In addition, in a case such that recording paper size to be fed from a manual feed tray 21 (refer to FIG. 1) changes variously, the size of recording paper recognized by the image forming apparatus control unit and the size of recording paper actually fed to the image forming unit may similarly differ due to error in operation of the manual feed tray or the like.

In such a case, for example, if the size of the image attempted to be printed is larger than the size of the recording paper actually fed, and image formation onto a photoconductor 1 is carried out as is, a portion of the toner image not transferred to the recording paper will remain on the photoconductor 1. In this case, the residual toner may splatter inside of a multifunction peripheral X1 or monochrome printer X2, and contaminate the inside of the device.

In addition, in a case of the size of the image attempted to be printed being smaller than the size of the recording paper actually fed, the image will be formed only on a portion of the recording paper, resulting in a misprint.

In contrast, an image forming apparatus is known that is easy for a user to decide that setting to continue or stop an image forming operation when there is a paper size inconsistency is performed by a user based not only on a consistency/inconsistency between the paper size detected and the designated paper size.

This image forming apparatus detects the size of recording paper fed, compares this detected paper size with the designated paper size thus designated, and in the case of there being an inconsistency between the two paper sizes, detects this as a paper size error. The user sets in advance whether or not to ignore this paper size inconsistency. When a setting is made to ignore the paper size inconsistency during the detection of a paper size error, the image forming operation continues, and when a setting is not made to ignore the paper size inconsistency, the image forming operation is interrupted. Then, when the paper size inconsistency is ignored and the image forming operation is continued, processing is performed to set the throughput of image formation to match the longer one among the feed-direction length of the detected paper size and the paper feed-direction length of the designated paper size.

Then, in this image forming apparatus, a registration sensor S2 is used that measures the size of the recording paper, and is provided just before the registration roller 28 in order to measure the timing at which to feed recording paper into the image forming unit.

However, the aforementioned such registration sensor S2 is provided just before the registration roller 28 feeding recording paper into a transfer unit; therefore, the moment at which the size of the recording paper is detected by the registration sensor S2 is after a majority of image formation has already been executed, and the transfer of excess toner to the intermediate transfer belt or photoconductor cannot be prevented even if stopping the image forming operation at this moment.

Therefore, with this image forming apparatus, the scattering of toner due to a mistake in the setting of the paper size cannot be prevented.

In addition, although the user sets in advance whether or not to ignore a paper size inconsistency in this image forming apparatus, the impact is completely different depending on which among the size set by the user for the paper size as previously described and the size of the recording paper actually fed is actually larger; therefore, a case will arise in which contamination from toner inside of the device cannot actually be prevented if whether or not to ignore is set in advance.

In addition, in order to eliminate such an inconvenience, a device also actually exists that normally causes the feed of recording paper to stop and forcibly brings about a paper jam in a case of an inconsistency in the recording paper size having been detected. However, in this case, every time an inconsistency in the size of the recording paper occurs, the user must deal with the paper jam, and thus the burden on the user will be great.

SUMMARY OF THE DISCLOSURE

The image forming apparatus according to the present disclosure can suppress malfunction from occurring, even in the case that the image size and size of the recording paper are inconsistent.

An image forming apparatus according to the present disclosure includes:

an image forming unit that forms the image on the photoconductor based on image information;

a registration roller that adjusts feed timing of recording paper to be fed to the image forming unit;

a paper feed unit that feeds recording paper to the image forming unit;

a feed sensor for detecting a feed-direction length of recording paper fed from the paper feed unit, provided further upstream than the registration roller in a vicinity of the paper feed unit;

a recording paper size inputting unit for inputting the size of recording paper to be fed to the paper feed unit;

a recording paper length detecting unit that detects a feed-direction length of recording paper passing through the feed sensor, based on a detection result of the feed sensor;

a recording paper length comparison unit that compares a length of recording paper detected by the recording paper length detecting unit, and a length of recording paper input through the recording paper size inputting unit; and an image formation stopping unit that, in a case of having determined as a result of comparison by the recording paper length comparison unit that the recording paper length detected by the recording paper length detecting unit is shorter than the length of the recording paper input through the recording paper size inputting unit, causes an image forming operation to a photoconductor by the image forming unit to stop before an image formation length in a vertical scanning direction by the image forming unit reaches a recording paper length detected by the recording paper length detecting unit.

Other objects of the present disclosure and specific advantages obtained by the present disclosure will be further clarified from the embodiment explained hereinafter.

DETAILED DESCRIPTION OF EMBODIMENTS

An embodiment of the present disclosure will be explained hereinafter while referring to the appended drawings to allow understanding of the present disclosure. It should be noted that the following embodiment is one example embodying the present disclosure, and is not characterized to limit the technical scope of the present disclosure.

Figure 1:
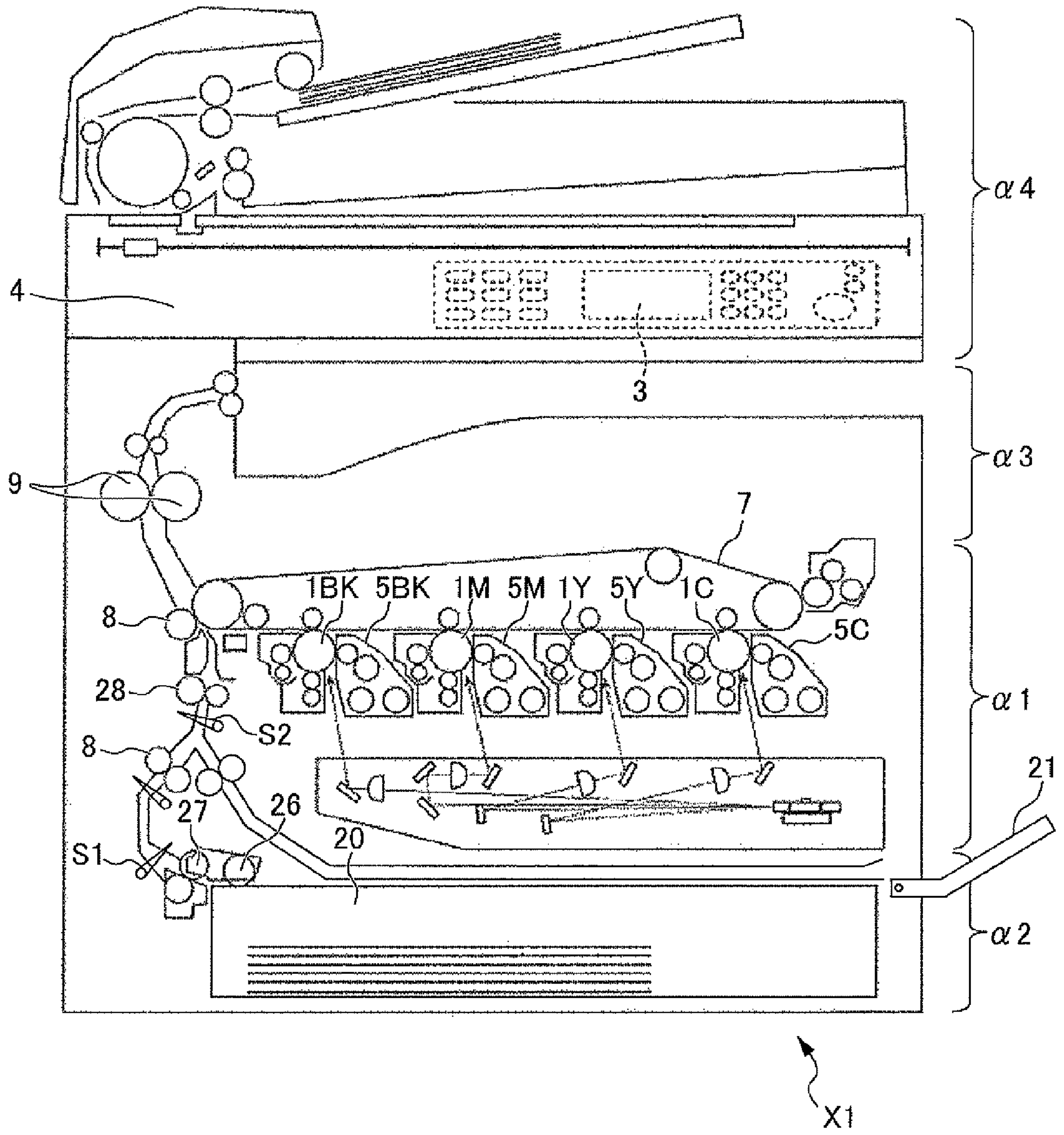
FIG. 1 is a cross-sectional view showing an overview of a multifunction peripheral X1 according to the present disclosure.
Figure 4:
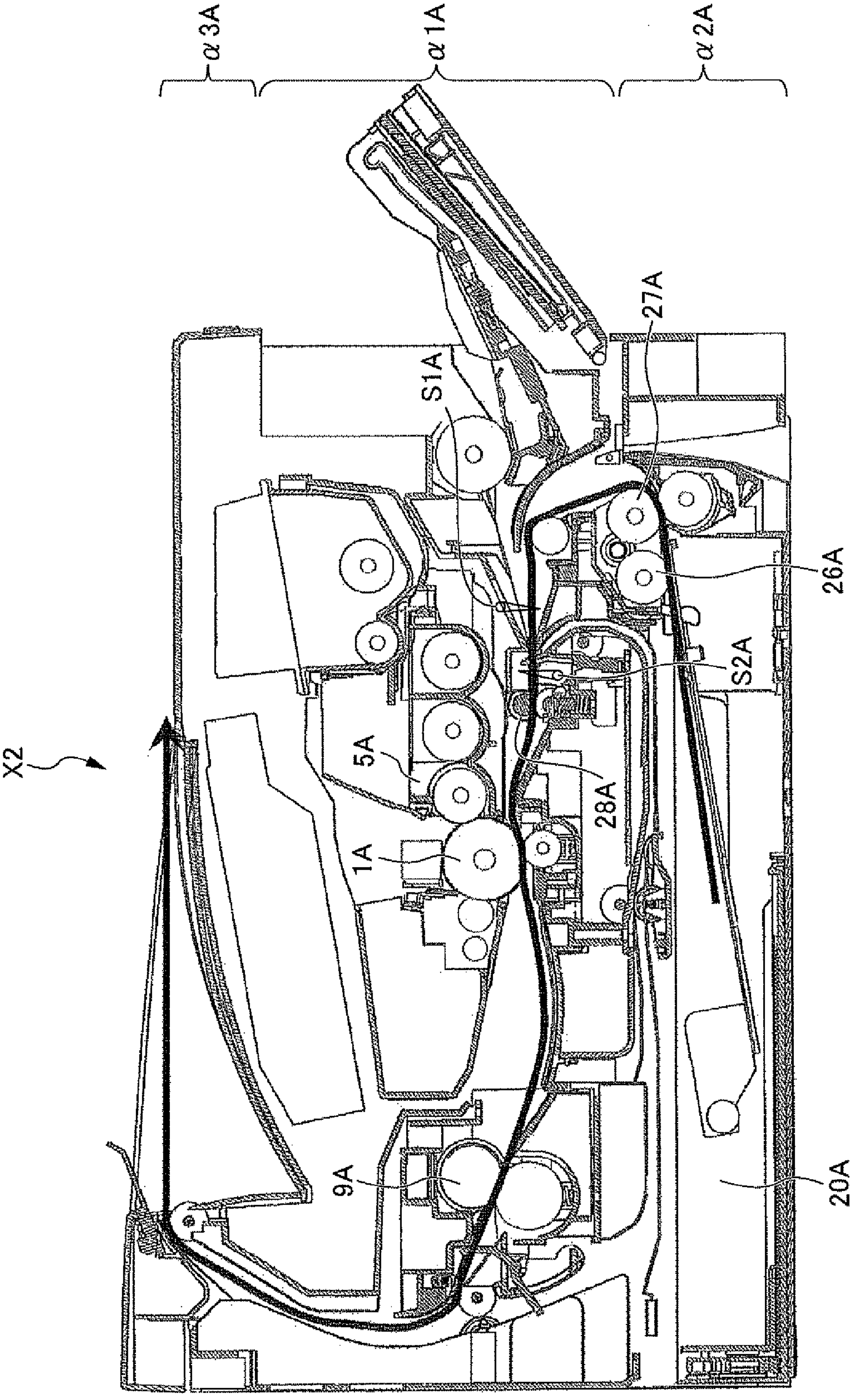
FIG. 4 is a cross-sectional view showing an overview of the monochrome printer X2 according to the present disclosure.

The present disclosure may be equally applied in a color multifunction peripheral X1 such as that shown in FIG. 1, or a monochrome printer X2 such as that shown in FIG. 4.

First, the overall configuration of the multifunction peripheral X1 according to the embodiment of the present disclosure will be explained based on the cross-sectional view of the multifunction peripheral X1 as one example of an image forming apparatus shown in FIG. 1 and on the control block diagram shown in FIG. 2. Thereafter, the monochrome printer X2 will be explained.

The multifunction peripheral X1 is an image forming apparatus of tandem format using the four toners of black (BK), magenta (M), yellow (Y) and cyan (C).

In summary, the multifunction peripheral X1 includes an image forming unit α1 that forms toner images on photoconductor described later and performs image formation on recording paper, a paper feed unit α2 that feed this recording paper to the image forming unit α1, and a paper ejection unit α3 at which ejection is carried out for recording paper on which image formation has been performed. In addition, the multifunction peripheral X1 of the present embodiment further includes an image reading unit α4.

The image information received from an external device such as a personal computer by a communication unit (not illustrated) is converted by a print engine unit 2 described later into pixel gradations, which is shade value information for each pixel related to the four colors of black (BK), magenta (M), yellow (Y) and cyan (C).

The image forming unit α1 is basically configured to include four photoconductor that support the above-mentioned four colors (1BK for black, 1M for magenta, 1Y for yellow, and 1C for cyan), respectively; a charging device that uniformly charges the surfaces of the respective photoconductor; an exposure source not covered by the drawing that forms an electrostatic latent image on the photoconductor 1 by irradiating every pixel on the surfaces of the respective photoconductor which have been charged in advance by the charging device with light of an amount of exposure corresponding to the pixel gradation determined by an image processing unit not covered by the drawing; developing devices (5BK, 5M, 5Y, 5C) that develop a toner image by supplying toner to the electrostatic latent image; an intermediate transfer belt 7 onto which the toner images formed on the surfaces of the respective photoconductor are sequentially transferred and that transfers this toner image to recording paper; a transport roller 8 that transports recording paper; a fusing device 9 that causes the toner image transferred onto the recording paper to be heated and fused; a static charge eliminating device not covered by the drawings that performs neutralizing of the photoconductor surfaces after transfer of the toner image to the recording paper; and the like (not illustrated).

The photoconductor (1BK for black, 1M for magenta, 1Y for yellow, and 1C for cyan) are photoconductor utilizing a-Si, which is high hardness and excels in durability, for example.

The charging devices uniformly charge the surfaces of the photoconductor. In a case of there being non-uniform charging on the photoconductor, a distribution in the initial potential will arise after charging by the charging device.

The exposure source is configured by a laser scanner device or the like that scans laser light in the axial direction of the photoconductor. The laser scanner device is configured to include a laser unit (not illustrated), polygonal mirror, polygonal mirror driving unit (not illustrated), and an optical system of lenses, mirrors, etc. In addition, a device configured by an LED array in which a plurality of LEDs are arranged per one pixel in main scanning direction of the photoconductor (1BK, 1M, 1Y, 1C) can be exemplified as the exposure source.

Herein, the electrostatic latent images are formed on the surfaces of the respective photoconductor by the exposure scanning by the exposure source.

Developing devices (5BK, 5M, 5Y, 5C) include developing rollers that supply toner to the photoconductor. In the developing devices, toner on the developing rollers is drawn onto the surface of the photoconductor according to the potential gap between the potential applied to the developing rollers thereof (developing bias potential) and the potential of the exposure unit of the photoconductor, whereby the electrostatic latent image is visualized as a toner image.

The paper feed unit α2 is basically configured to include a paper feed cassette 20, paper supply roller 26, feed roller 27, feed sensor S1, etc.

The feed sensor S1 is provided at the outlet of the paper feed cassette 20.

The recording paper stored in advance in the paper feed cassette 20 is sent to the feed roller 27 by the paper supply roller 26 being rotationally driven, and is sent by the feed roller 27 to the registration roller 28 through the feed sensor S1, which is the on the most upstream side among the feed sensors.

After the recording paper has been detected by a registration sensor S2 provided just short of the registration roller 28, it is sent to the registration roller 28 and temporarily stops. At this time, the recording paper continues to be sent by a transport roller 8, and in order to prepare the leading end of the recording paper, a curve is established. Subsequently, when preparation of an image forming operation to an intermediate transfer belt 7 has completed, the registration roller 28 picks up the timing of image forming, and rotates again synchronously with the driving of the intermediate transfer belt 7.

The registration roller 28 adjusts the timing to supply the recording paper to the image forming unit α1. More specifically, the registration roller 28 adjusts the timing to supply the recording paper to the transfer portion formed between the intermediate transfer belt 7 and transport roller 8, so that an image is transferred at a suitable position on the recording paper.

The recording paper is thereby fed to the image forming unit α1.

The recording paper thus fed from the paper feed unit α2 is fed by the transport roller 8 while the toner image is transferred from the intermediate transfer belt 7. Then, the recording paper onto which the toner image has been transferred is fed to the fusing device 9, and the toner image is heated and fused by a heat roller and a pressure roller. Thereafter, the recording paper is fed to the paper ejection unit α3 and ejected.

Figure 2:
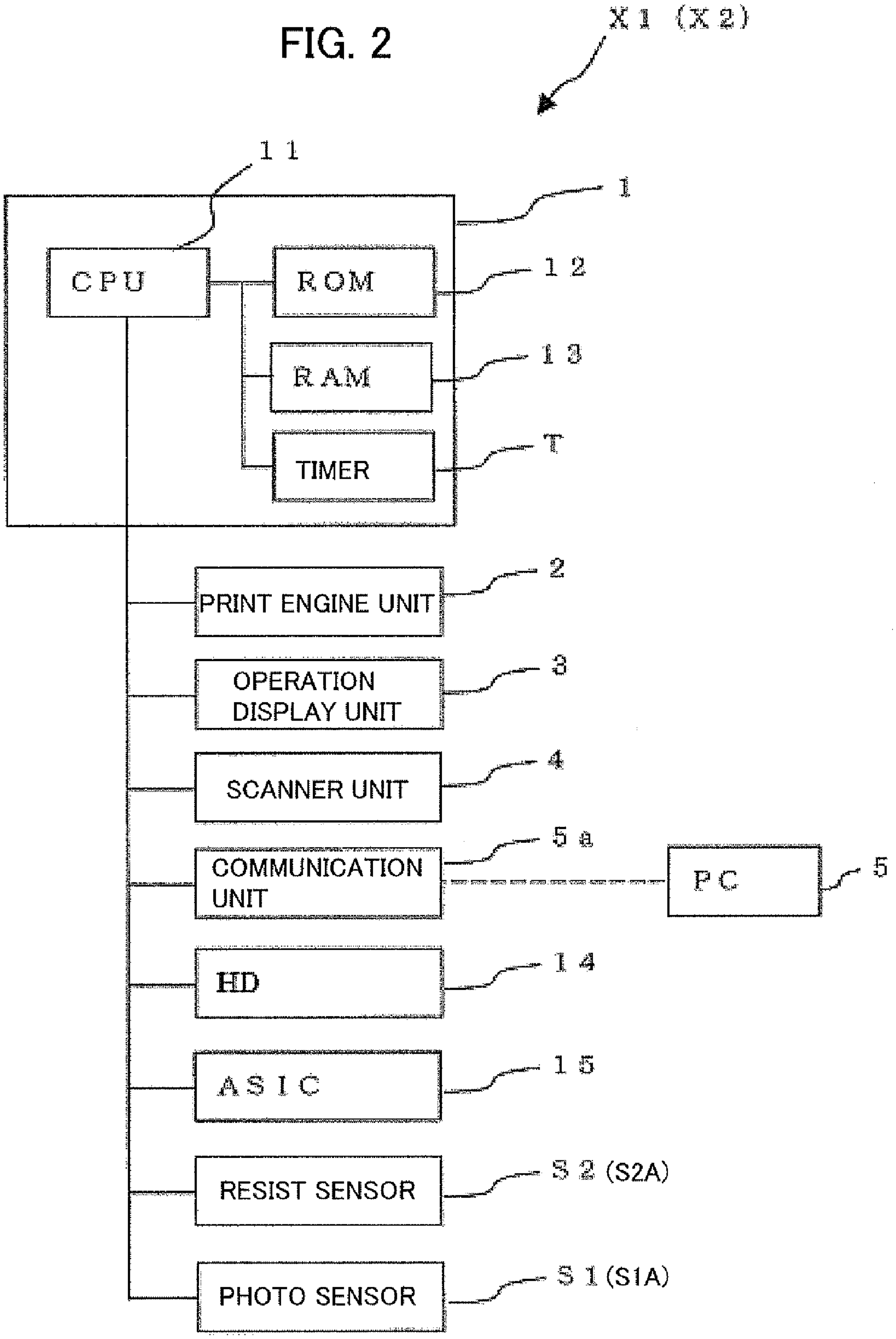
FIG. 2 is a block diagram showing an overall control system of the multifunction peripheral X1 and a monochrome printer X2 according to one embodiment of the present disclosure.

The multifunction peripheral X1 has, the configuration of the control system thereof, a control unit 1, print engine unit 2, operation display unit 3, scanner unit 4, and the like, as shown in FIG. 2. In addition, the multifunction peripheral X1 connects and communicates with an external terminal (hereinafter referred to as "PC").

The multifunction peripheral X1 can print an image corresponding to image information read from the scanner unit 4 or image information transmitted from a PC 5 onto paper, by the control unit 1 controlling the print engine unit 2 according to a manipulated input via the operation display unit 3 or input information from the PC 5.

The control unit 1 has a CPU 11 (Central Processing Unit), as shown in FIG. 2. In addition, the control unit 1 is provided peripheral devices and the like such as ROM 12 (Read Only Memory), RAM 13 (Random Access Memory) as an example of a temporary storage unit, and a hard disk 14.

The control unit 1 has the CPU 11 that performs general control of the multifunction peripheral X1, including image forming operation, according to the present embodiment by executing a control program recorded in advance in the RAM 12 or HD 14 based on reference data stored in the RAM 13 and executing operating in conjunction with an ASIC 15 (Application Specific Integrated Circuit).

It should be noted that, although one HD 14 is established in FIG. 2, it may a plurality of hard disks, and may be a configuration such that information input and programs such as the operation system and applications are recorded separately.

The print engine unit 2 includes all equipment for forming an image such as photoconductor (1BK for black, 1M for magenta, 1Y for yellow, 1C for cyan), a charging device, a exposing device, a developing device (5BK, 5M, 5Y, 5C), a transfer device including the intermediate transfer belt 7 and the drive unit thereof, a fusing device 9, and paper supply and feed devices including a drive source such as the paper supply roller 26, the feed roller 27 and the registration roller 28. Each of these devices communicates with the control unit 1.

The print engine unit 2 prints a toner image on paper based on image information read by the scanner unit 4 or image information transmitted from the PC 5, by each of these devices being controlled by the CPU 11 according to an image formation request manually inputted via the operation display unit 3, or an image formation request transmitted from the PC 5, which can communication through a communication unit 5*a*. In other words, the print engine unit 2 has a printer function.

Next, the monochrome printer X2 will be explained. Since the printer function of the monochrome printer X2 is also similar to the multifunction peripheral X1, it will be explained by focusing on portions differing from the multifunction peripheral X1 described above. It should be noted that, since the basic functions are the same as a multifunction peripheral, the configuration of the control device will be explained while referring to FIG. 2.

The monochrome printer X2 uses toner of only a single color, usually black (BK).

Similarly to the multifunction peripheral X1, the monochrome printer X2 in summary has an image forming unit α1A that forms a toner image and performs image formation on recording paper, a paper feed unit α2A that supplies this recording paper to the image forming unit α1A, and a paper ejection unit α3A that ejects recording paper on which image formation has been performed.

The image information received from an external device such as a personal computer by a communication unit, which is not illustrated, is converted by a print engine unit 2A, into pixel gradations, which is shading value information for each pixel.

The image forming unit α1A is basically configured to include a single photoconductor 1A; a charging device that uniformly charges the surface of the photoconductor 1A; an exposure source not covered by the drawing that writes an electrostatic latent image on the photoconductor 1A by irradiating every pixel on the surface of the photoconductor 1A with light of an amount of exposure corresponding to the pixel gradation determined by an image processing unit not covered by the drawing; a developing device that develops a toner image by supplying toner to the electrostatic latent image; a transfer device that transfers the toner image on the photoconductor 1A onto the recording paper; a fusing device 9A that causes the toner image transferred onto the recording paper to be heated and fused; a static charge eliminating device not covered by the drawings that performs neutralizing of the photoconductor surface after transfer of the toner image to the recording paper; and the like (not illustrated).

The paper feed unit α2A is configured to include a paper feed cassette 20A, paper supply roller 26A, and feed roller 27A. A feed sensor S1A, registration roller 28A, registration sensor S2A and the like are provided in order on a downstream side of the feed roller 27A in the paper feed direction.

The recording paper stored in advance in the paper feed cassette 20A is sent to the feed roller 27A by the paper supply roller 26A rotationally driving.

Then, after having passed through the feed sensor S1A via the feed roller 27A, the recording paper is sent to the registration roller 28A on the trailing side. After the recording paper has been detected by the registration sensor S2 provided just short of the registration roller 28A, it is sent to the registration roller 28A and temporarily stops. At this time, the recording paper continues to be sent by the transport roller 8, and in order to prepare a leading end of the recording paper, a curve is established.

Subsequently, when preparation of an image forming operation to the photoconductor 1 has completed, the registration roller 28A picks up the timing of image writing, and rotates again synchronously with the driving of the photoconductor 1A. The registration roller 28A adjusts the timing to supply the recording paper to the image forming unit α1A. More specifically, the registration roller 28A adjusts the timing to supply recording paper to the transfer portion formed between the photoconductor 1A and an opposing roller that faces the photoconductor 1A, so that the image is transferred at a suitable location on the recording paper.

The recording paper is thereby fed to the image forming unit α1A.

The toner image supported on the photoconductor 1A is transferred to recording paper thus fed by the registration roller 28A. Then, the recording paper onto which the toner image has been transferred is fed to the fusing device 9A, and the toner image is heated and fused by a heat roller and a pressure roller. Subsequently, the recording paper is fed to the ejection unit α3A and ejected.

Since the configuration of the control system of the monochrome printer X2 described above is similar to that illustrated in FIG. 2, an explanation thereof will be omitted herein.

Although the present disclosure is applicable to an image forming apparatus such as the multifunction peripheral X1 and the monochrome printer X2 as described in the foregoing, the monochrome printer X2 will be explained as an embodiment herein.

As shown in FIG. 2, this monochrome printer X2 is configured so as to detect the size of recording paper actually provided for image formation based on a signal from the feed sensor S1A, which detects the recording paper leaving the paper supply roller 26A, and depending on the results thereof, change the mode of actual image formation processing.

Figure 3:
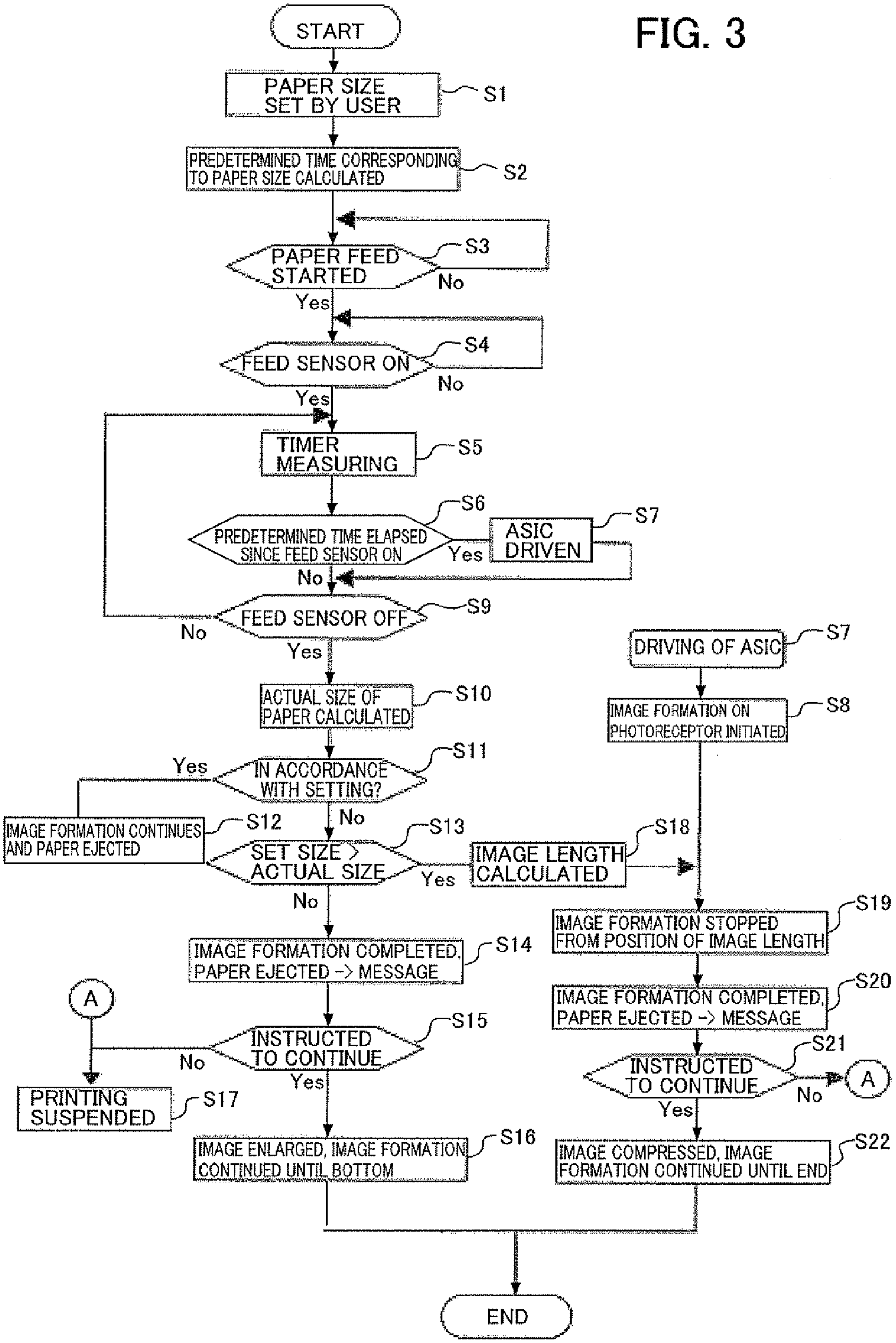
FIG. 3 is a flowchart showing an image forming operation sequence of an image forming apparatus according to the present disclosure.

In addition, the procedure of the CPU 11 will be explained hereinafter while referring to FIG. 3.

Hereinafter, the processing sequence of the CPU 11 illustrated in FIG. 3 will be explained to allow understanding of the present embodiment.

Herein, S1, S2, . . . are identification symbols (step numbers) for the processing sequence.

First, before a printing operation, the size of the recording paper supplied in this monochrome printer X2 is set by the user (Step S1). Such a setting is performed by operating a dial and/or button for setting the size, or by an automatic detection function for the size when recording paper is taken in from a manual feed tray. Naturally, it is not to be limited to this, and may be input by a manual input via the operation display unit 3.

As explained above, a manual operation receiving portion that enables input (setting) of the size of the recording paper to be supplied to the paper feed unit is one example of a recording paper size inputting unit of the present embodiment.

However, the setting or detecting of the recording paper herein has the potential to disagree with the actual size of the recording paper, as described later.

When the size of the recording paper is set or detected as described above, the CPU 11 calculates the time for which the recording paper of this size is fed by the transport roller, based on the feed rate and the length in the feed direction of the recording paper set or detected (Step S2). This calculation result is used later.

Next, the CPU 11 causes the paper supply roller 26A to rotationally drive, thereby starting the feeding of one sheet from among the recording paper in the paper feed tray 20A to the feed sensor S1A (Step S3). Before long, the leading end of recording paper thus fed is detected at the feed sensor S1A (Step S4). When a detection signal from the feed sensor S1A is received, the CPU 11 starts timing by activating the timer T (Step S5).

When a predetermined time set in advance has elapsed since the above-mentioned timer T is made to start (YES in Step S6), the CPU 11 instructs the print engine 2 to drive the exposure device by the ASIC 15 described above so as to expose the photoconductor 1, and start the formation of an electrostatic latent image based on the image information sent from the PC (Step S8).

In this example, the signal from the feed sensor S1A defines an opportunity for the above-mentioned timing to start image formation. This is because it is too late after the arrival of recording paper is detected by the registration sensor S2A, which is provided immediately before the registration roller 28A, and there is a possibility for image formation for the copy of one sheet to have already been completely finished. Therefore, it is appropriate for the feed sensor S1A to be provided at a location such that, even if image formation processing is interrupted as described later at the moment when the detection of the feed-direction length of the recording paper ends, excess toner is not transferred to the photoconductor.

The CPU 11 determines whether the feed sensor S1 has been turned OFF in Step S6, i.e. whether recording paper has passed through the feed sensor S1A (Step S9). In the case that the recording paper has not passed through the feed sensor S1A, the CPU 11 returns the processing to Step S5, and waits for the passage of the recording paper.

In Step S9, in the case of having determined that the feed sensor S1 has turned OFF (YES in Step S9), the CPU 11 (recording paper length detecting unit) calculates the actual size in the feed direction of the recording paper actually having passed based on the measured time of the above-mentioned timer T, i.e. transit time of the recording paper (Step S10).

In this way, the CPU 11 (recording paper length detecting unit) detects the feed-direction length of the recording paper passing through the feed sensor S1A based on the transition timing from the ON state to OFF state of the feed sensor S1A, in the present embodiment. The CPU 11 (recording paper length detecting unit) detects the length in the feed direction of the recording paper passing through the feed sensor S1A based on the detection results from the feed sensor S1A.

Next, the CPU 11 determines whether or not the actual size of the recording paper calculated in the above Step S10 equals the size set or input, i.e. whether or not the size is in accordance with the setting. Herein, if the size is in accordance with the setting, since there is no problem with the size of the image and the size of recording paper agreeing with the intention of the user, the print processing continues until printing of this page has completed (Step S12).

In the case that it is determined not to be in accordance with the setting (NO in Step S11), the CPU 11 determines whether or not the set size is larger than the measured size (Step S13). The CPU 11 (recording size comparison unit) compares between the size of the recording paper detected by the feed sensor S1 in this way, and the size of the recording paper input (set) via the recording paper size inputting unit.

Herein, in the case that the actual size is larger than the set size (NO in Step S13), the CPU 11 (image formation stopping unit) causes the image formation for the above-mentioned first sheet to finish at the bottom of the page (Step S14). Furthermore, the CPU 11 (display control unit) causes a message inquiring whether or not printing should be continued to be displayed on the operation display unit 3 (Step S14). Buttons for inputting whether or not to continue are jointly displayed in this display. For example, by configuring the operation display unit 3 by way of a touch panel, it is possible to both display the above-mentioned message for inquiring, and display buttons for inputting whether or not to continue, together with this message for inquiring.

Among the buttons displayed corresponding to this display, in the case of a button displaying to continue being pushed (selected) (YES in Step S15), the CPU 11 (continuation processing unit) performs processing to enlarge the size of the image to match the actual size, continues image formation from the first sheet, or from the second sheet until the last sheet based on the enlarged image, and ejects these sheets (Step S16).

In addition, in the case that the button to not continue printing is pushed in Step S15, the CPU 11 causes the printing process to end with only the printing of one sheet (Step S17).

In addition, in the case that it is determined that the set size is larger than the actual size in Step S13 (YES in Step S13), the CPU 11 calculates the length of the image in vertical scanning direction for the set size (Step S18).

Then, the CPU 11 (image formation stopping unit) causes the image forming operation to the photoconductor by the image forming unit instructed to the ASIC in Step S8 to stop before the image formation length in the vertical scanning direction according to the image forming unit reaches the recording paper length according to the feed sensor S1 (Step S19).

In other words, first, the CPU 11 calculates the length in the feed direction of the image set in accordance with the set size. Then, in the case that the length in the feed direction of the image thus calculated is longer than the length in the feed direction of the recording paper, the CPU 11 (image formation stopping unit) controls the image forming operation to the photoconductor by the image forming unit, so that the image length in the vertical scanning direction according to the image forming unit becomes no more than (or less than) the length in the feed direction of the actual size of the recording paper.

In the present embodiment, in the case that such a detected recording paper length is determined to be shorter than the length of the recording paper input via the recording paper size inputting unit, the CPU 11 (image formation stopping unit) causes the image forming operation to the photoconductor by the image forming unit to stop before the image formation length in the vertical scanning direction according to the image forming unit reaches the recording paper length according to the recording paper length detecting unit.

Herein, as an operation to cause the image forming operation to the photoconductor by the image forming unit to stop, the CPU 11 (image formation stopping unit) can cause the operation of the developing device to stop, for example.

Then, the CPU 11 (display control unit) causes an inquiry for whether or not to continue printing to be displayed on the operation display unit 3 (Step S20). Although the inquiry can be performed by displaying text such as a comment or a symbol, it is not limited thereto. Buttons for inputting whether or not to continue are jointly displayed in this display. Herein, by configuring the operation display unit 3 by way of a touch panel similarly to as mentioned above, it is possible to both display the above-mentioned message for inquiring, and display buttons for inputting whether or not to continue together with this message for inquiring.

Among the buttons displayed corresponding to this display, in the case of a button displaying to continue being pushed (selected) (YES in Step S21), the CPU 11 (continuation processing unit) performs processing to compress the size of the image to match the actual size, continues image formation from the first sheet, or from the second sheet until the last sheet based on the above compressed image, and ejects these sheets (Step S22). In addition, in the case that the button to not continue printing is pushed in Step S21 (NO in Step S21), the CPU 11 (continuation processing unit) causes the printing process to end with only the printing of one sheet in the above way (Step S17).

According to the present embodiment, by detecting the actual size of the recording paper and comparing with the set size in this way, in the case of both sizes differing, the size of the image stored is enlarged or compressed to match the size of the actual recording paper, and thus despite the size differing, a clear printed product desired by the user can be prepared without stopping the operation of the device and without necessitating effort and time for resetting. The burden on the user is thereby remarkably decreased.

In addition, according to the present embodiment, it is possible to provide an image forming apparatus that can suppress malfunction from occurring, even in the case that the image size and size of the recording paper are inconsistent.

Furthermore, according to the present embodiment, it is possible to provide an image forming apparatus that, in the case of the paper size set by the user and the size of paper actually fed differing, performs logical processing so that the user is not made to deal with unwanted paper jams or the like, and can completely prevent contamination inside the device from the scatter of toner.

Moreover, according to the present embodiment, it is possible to provide an image forming apparatus that can perform the appropriate processing in response to the type of the inconsistency of recording paper without placing burden on the user due to normally stopping feed of recording paper in a case of an inconsistency in the size of the recording paper being detected and forcibly causing a paper jam to occur, and without contamination occurring inside the device due to unwanted residual toner being left on the photoconductor such as the intermediate transfer belt.

In addition, according to the present embodiment, even in a case of the recording paper length detected by the recording paper length detecting unit being shorter than the length of the recording paper input through the recording paper size inputting unit, the image formation length in the vertical scanning direction by the image forming unit will not exceed the recording paper length according to the recording paper length detecting unit. As a result, the image forming apparatus can suppress toner from scattering inside of the device, since excess toner that has not been transferred does not remain on the photoconductor.

Furthermore, the image forming apparatus curbs the consumption of excessive toner, and thus excels in cost efficiency.

Moreover, according to the present embodiment, in the case of having determined, as a result of the comparison by the recording paper length comparison unit, that the recording paper size detected by the recording paper length detecting unit is longer than the length of the recording paper input through the recording paper size inputting unit, the image forming operation to the photoconductor by the image forming unit can be controlled so as to continue at least to the bottom of the page thereof.

In this case, since the issue of scattering of excess toner does not occur, a problem does not occur even if printing is made to resume until the bottom of the page.

In addition, according to the present embodiment, the image forming apparatus is configured to be able to display on the operation display unit an inquiry as to whether or not to continue an image forming operation, in a case of having determined that the paper size and image size differ in the above way.

The image forming apparatus is thereby configured to enable continuation processing that follows the intention of the user.

Herein, the inquiry is performed by displaying text such as a comment, symbols, or the like, for example. The image forming apparatus can thereby have the intention of the user more accurately reflected.

In addition, in the present embodiment, in a case of a command to continue being input in response to the inquiry, if the recording paper length detected by the recording paper length detecting unit is shorter than the length of the recording paper input through the recording paper size inputting unit as a result of comparison by the recording paper length comparison unit, the image forming apparatus compresses the size of the image formed being based on the image information to a size corresponding to the recording paper length detected by the recording paper length detecting unit.

Furthermore, in the present embodiment, in a case of a command to continue being input in response to the inquiry, if the recording paper length detected by the recording paper length detecting unit is longer than the length of the recording paper input through the recording paper size inputting unit as a result of comparison by the recording paper length comparison unit, the image forming apparatus enlarges the size of the image formed being based on the image information to a size corresponding to the recording paper length detected by the recording paper length detecting unit.

The image forming apparatus is thereby configured to allow printing to be continued, even if the sizes of the images to be printed are somewhat modified. In addition, the image forming apparatus is configured so as to be able to adjust the sizes of images and continue printing, without requiring the size settings to be changed one by one.

The present disclosure is generally capable of being applied to image forming apparatuses. In particular, the applicability of the image forming apparatus is confirmed for photocopiers, facsimile machines, and multifunction peripherals of these.

What is claimed is:

1. An image forming apparatus comprising:

an image forming unit that forms an image on a photoconductor based on image information;

a registration roller that adjusts feed timing of a sheet of recording paper to be fed to the image forming unit;

a paper feed unit that feeds the sheet of recording paper to the image forming unit;

a feed sensor for detecting a feed-direction length of the sheet of recording paper fed from the paper feed unit, provided further upstream than the registration roller in a vicinity of the paper feed unit;

a recording paper size inputting unit for inputting a size of the sheet of recording paper to be fed to the paper feed unit;

a recording paper length detecting unit that detects the feed-direction length of the sheet of recording paper passing through the feed sensor, based on a detection result of the feed sensor;

a recording paper length comparison unit that compares the length of the sheet of recording paper detected by the recording paper length detecting unit, and a length of the sheet of recording paper input through the recording paper size inputting unit; and an image formation stopping unit that causes the image forming unit to control an image forming operation applied to the photoconductor when the recording paper length comparison unit has determined that the detected length of the sheet of recording paper is different from the input length thereof, an operation display unit;

a display control unit configured to cause the operation display unit to display an inquiry as to whether or not to continue a printing process, when the recording paper length comparison unit has determined that the detected length of the sheet of recording paper is different from the input length thereof, wherein the image formation stopping unit is configured to cause the image forming unit to stop the image forming operation applied to the photoconductor before a length of image formation performed by the image forming unit in a secondary scanning direction along a sheet feed direction reaches the detected length of the sheet of recording paper, when the recording paper length comparison unit has determined that the detected length of the sheet of recording paper is shorter than the input length thereof, wherein the image formation stopping unit is configured to cause the image forming unit to continue the image forming operation applied to the photoconductor at least to the bottom of a page, when the recording paper length comparison unit has determined that the detected length of the sheet of recording paper is longer than the input length thereof, wherein the image forming apparatus performs printing of a first sheet of recording paper even if the recording paper length comparison unit has determined that the detected length of the sheet of recording paper is different from the input length thereof, and wherein the display control unit is configured to cause the operation display unit to display the inquiry as to whether or not to continue the printing process without exchanging the sheet of recording paper for a sheet of recording paper having the size of the sheet of recording paper entered via the recording paper size inputting unit subsequent to the image formation stopping unit causing the image forming unit to finish controlling of the image forming operation applied to the photoconductor.

2. The image forming apparatus according to claim 1, further comprising a continuation processing unit that compresses a size of the image to be formed based on the image information to a size corresponding to the detected length of the sheet of recording paper when the recording paper length comparison unit has determined that the detected length of the sheet of recording paper is shorter than the input length thereof for a case where a command to continue the printing process is input in response to the inquiry.

3. The image forming apparatus according to claim 2, wherein the continuation processing unit causes the image forming unit to restart the image forming operation from a first page or a second page.

4. The image forming apparatus according to claim 1, further comprising a continuation processing unit that enlarges a size of the image to be formed based on the image information to a size corresponding to the detected length of the sheet of recording paper when the recording paper length comparison unit has determined that the detected length of the sheet of recording paper is longer than the input length thereof for a case where a command to continue the printing process is input in response to the inquiry.

5. The image forming apparatus according to claim 1, further comprising a continuation processing unit that enlarges a size of the image to be formed being based on the image information to a size corresponding to the detected length of the sheet of recording paper when the recording paper length comparison unit has determined that the detected length of the sheet of recording paper is longer than the input length thereof for a case where a command to continue the printing process is input in response to the inquiry; and causes the image forming unit to restart the image forming operation from a first page or a second page.

6. The image forming apparatus according to claim 1, wherein the image forming apparatus comprises a photocopier, facsimile machine and a multifunction peripheral thereof.

* * * * *